United States Patent
Rieder et al.

(10) Patent No.: US 12,461,059 B2
(45) Date of Patent: Nov. 4, 2025

(54) GAS SENSOR WITH A RESONANT ELEMENT, METHOD FOR PRODUCING THE SAME AND USE OF THE SAME FOR DETECTING GASES

(71) Applicant: Infineon Technologies AG, Neubiberg (DE)

(72) Inventors: Bernhard Rieder, Regensburg (DE); Rainer Markus Schaller, Saal a.d. Donau (DE)

(73) Assignee: Infineon Technologies AG, Neubiberg (DE)

( * ) Notice: Subject to any disclaimer, the term of this patent is extended or adjusted under 35 U.S.C. 154(b) by 701 days.

(21) Appl. No.: 17/662,593

(22) Filed: May 9, 2022

(65) Prior Publication Data
US 2022/0373507 A1 Nov. 24, 2022

(30) Foreign Application Priority Data
May 18, 2021 (DE) .......................... 102021112811.0

(51) Int. Cl.
*G01N 27/414* (2006.01)
*G01N 33/00* (2006.01)

(52) U.S. Cl.
CPC ..... *G01N 27/4141* (2013.01); *G01N 33/0036* (2013.01)

(58) Field of Classification Search
CPC .............................................. G01N 27/4141
See application file for complete search history.

(56) References Cited

U.S. PATENT DOCUMENTS

| 6,477,901 | B1 | 11/2002 | Tadigadapa et al. | |
|---|---|---|---|---|
| 6,823,720 | B1 | 11/2004 | Adkins et al. | |
| 2016/0266061 | A1 | 9/2016 | Yu et al. | |
| 2016/0356700 | A1* | 12/2016 | Rouxel | G01N 29/2425 |
| 2018/0003605 | A1 | 1/2018 | Lee et al. | |
| 2019/0352175 | A1* | 11/2019 | Tumpold | B81C 1/00309 |
| 2021/0389277 | A1* | 12/2021 | Park | G01N 29/036 |

FOREIGN PATENT DOCUMENTS

| CN | 101144827 A | 3/2008 |
|---|---|---|
| DE | 102007031128 A1 | 1/2009 |
| DE | 102019217465 A1 | 5/2021 |
| EP | 3719453 A1 | 10/2020 |
| WO | 2018/114187 A1 | 6/2018 |

OTHER PUBLICATIONS

Beardslee et al., "Thermally Actuated Silicon Tuning Fork Resonators for Sensing Applications in Air," Proceedings of the IEEE International Conference on Micro Electro Mechanical Systems (MEMS), Jan. 2012, 5 pages.

\* cited by examiner

*Primary Examiner* — Douglas M Menz
(74) *Attorney, Agent, or Firm* — Harrity & Harrity, LLP

(57) ABSTRACT

A gas sensor comprises a substrate, a first semiconductor-based sensor element for determining the density and/or viscosity of a gas, which element is arranged above the substrate and which has a resonant element, and a cover arranged above the first sensor element, wherein the substrate and/or the cover has an opening to allow the passage of a gas to the first sensor element.

22 Claims, 2 Drawing Sheets

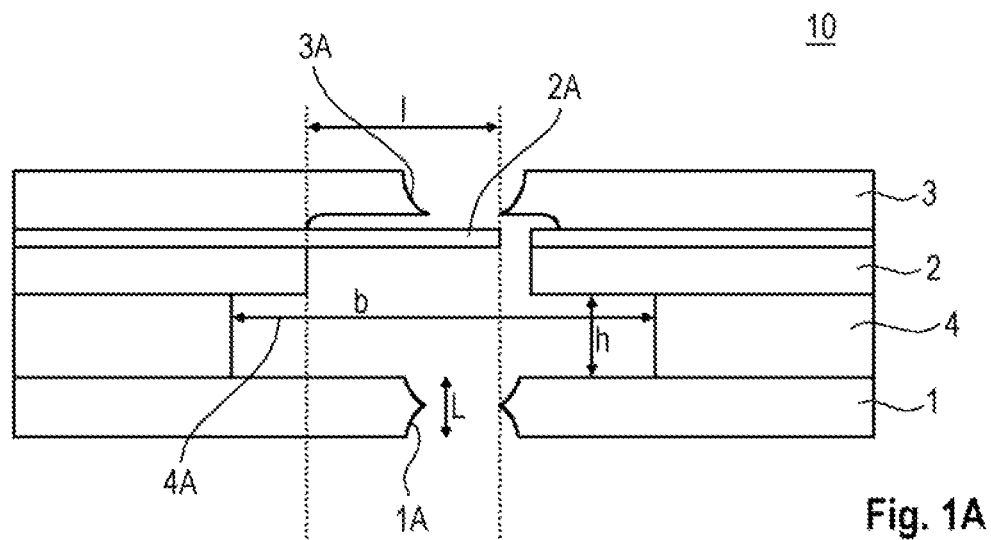
Fig. 1A
Fig. 1B
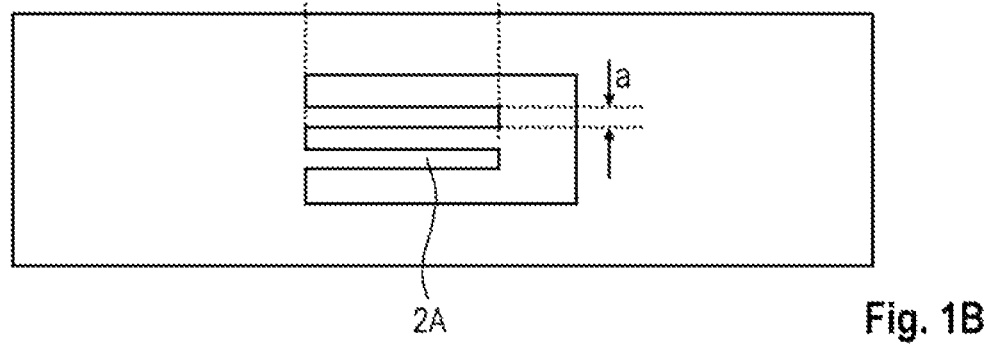
Fig. 2

GAS SENSOR WITH A RESONANT ELEMENT, METHOD FOR PRODUCING THE SAME AND USE OF THE SAME FOR DETECTING GASES

CROSS REFERENCE TO RELATED APPLICATION

This application claims priority to German Patent Application No. 102021112811.0 filed on May 18, 2021, the content of which is incorporated by reference herein in its entirety.

TECHNICAL FIELD

The present disclosure relates to a gas sensor, a method for producing the same, and the use of the same for the detection of gases, in particular hydrogen.

BACKGROUND

In the field of electromobility, the fuel cell is becoming increasingly important. The operation of fuel cells relies primarily on hydrogen. A fuel cell system operated with hydrogen gas ($H_2$) has one or more hydrogen storage tanks in addition to a fuel cell. Such hydrogen storage tanks, for example when used in a motor vehicle, can be configured as cylinders in which the hydrogen is stored under an elevated pressure of approximately 700 bar. If a number of such hydrogen storage tanks are installed in the motor vehicle, a range of the vehicle can be configured accordingly.

For the operation of a fuel cell system in a motor vehicle the safety aspect is of particular importance. Since gaseous hydrogen reacts exothermally with oxygen from the air over a wide ignition range, even with low ignition energy (explosive gas reaction), it is extremely important to detect, safely and reliably, the presence of hydrogen outside the hydrogen storage tanks and the fuel cell, the supply and discharge lines.

These and other reasons motivate a need for the present disclosure.

SUMMARY

A first aspect of the present disclosure relates to a gas sensor, comprising a substrate, a first semiconductor-based sensor element for determining the density and/or viscosity of a gas, which is arranged above the substrate and has a resonant element, and a cover arranged over the first sensor element, wherein the substrate and/or the cover has an opening to allow the passage of a gas to the first sensor element.

A second aspect of the present disclosure relates to a method for producing a gas sensor, the method comprising: providing a substrate; depositing a semiconductor-based layer on the substrate; producing a first sensor element in the semiconductor-based layer, forming a resonant element; and mounting a cover on the first sensor element, wherein the substrate and/or the cover has an opening to allow the passage of a gas to the first sensor element.

A third aspect of the present disclosure relates to the use of a gas sensor according to the first aspect for detecting a gas, in particular hydrogen.

BRIEF DESCRIPTION OF THE DRAWINGS

A gas sensor in accordance with the disclosure is described in more detail in the following based on drawings.

The elements shown in the drawings are not necessarily reproduced true to scale relative to each other. Identical reference signs can refer to identical components. Identical reference signs refer to corresponding identical or similar parts.

FIGS. 1A and 1B show a lateral cross-sectional view (A) and a plan view (B) of an example implementation of a gas sensor, which has a first sensor element with a resonant element and a second sensor element with an acoustic resonator.

FIG. 2 shows a lateral cross-sectional view of an example implementation of a combined gas sensor, which in addition to the gas sensor shown in FIGS. 1A and 1B has a further semiconductor-based sensor element for measuring the pressure of the gas.

DETAILED DESCRIPTION

Figure 3:
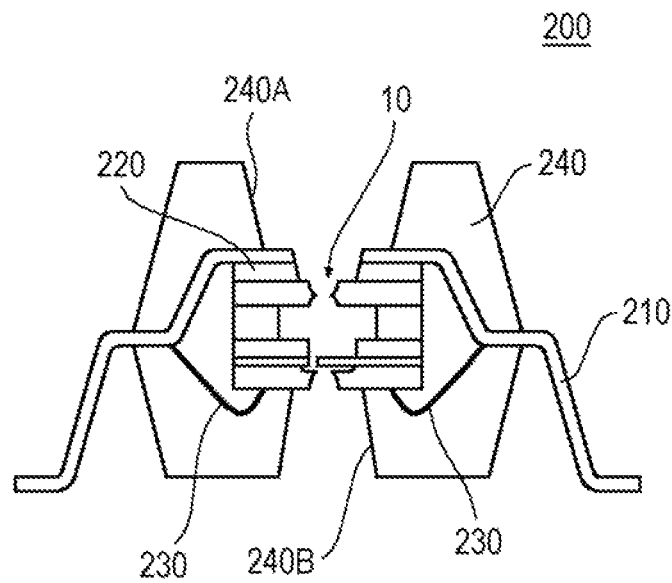
FIG. 3 shows a lateral cross-sectional view of an example implementation of a gas sensor which is housed in a package.

In the detailed description that follows, reference will be made to the attached drawings, which form part of this description and in which specific implementations in which the disclosure may be realized are shown for illustration purposes. A directional terminology is used, such as "top", "bottom", "front", "back", "leading", "trailing" etc. in relation to the orientation of the figure(s) to be described. Since the components of implementations can be positioned in different orientations, the directional indication is only used for illustration purposes and is not restrictive in any way. It should be understood that other implementations can also be used and structural or logical changes can be made without exceeding the scope of the present disclosure. The following detailed description is therefore not to be understood in a restrictive sense, and the scope of the present disclosure is defined by the attached claims.

It should be understood that the features of the various example implementations described herein can be combined with one another, unless expressly stated otherwise.

As used in this description, the terms "bonded", "attached", "connected", "coupled" and/or "electrically connected/electrically coupled" do not mean that the elements or layers must be directly in contact with each other; intermediate elements or layers can be provided between the "bonded", "attached", "connected", "coupled" and/or "electrically connected/electrically coupled" elements. According to the disclosure, however, the above terms may optionally have the specific meaning that the elements or layers are directly in contact with each other (e.g., that no intermediate elements or layers are provided between the "bonded", "attached", "connected", "coupled" and/or "electrically connected/electrically coupled" elements).

In addition, the word "over" used in relation to a part, an element, or a material layer that is formed or arranged "over" a surface may mean herein that the part, element, or material layer is "indirectly" arranged (for example, placed, formed, deposited, etc.) on the implied surface, with one or more additional parts, elements, or layers being arranged between the implied surface and the part, element, or material layer. However, the word "over" used in relation to a part, an element, or a material layer that is formed or arranged "over" a surface can optionally also have the specific meaning that the part, the element, or material layer is arranged (e.g., placed, molded, deposited, etc.) "directly on" (e.g., in direct contact with, the implied surface).

FIGS. 1A and 1B show an example implementation of a gas sensor according to the present disclosure.

The gas sensor 10 according to FIGS. 1A and 1B comprises a substrate 1, a first semiconductor-based sensor element 2 for determining the density and/or viscosity of a gas, wherein the first semiconductor-based sensor element 2 is arranged above the substrate 1 and comprises a resonant element 2A. The gas sensor 10 also contains a cover 3 which is arranged above the first sensor element 2, wherein the substrate 1 and the cover 3 each have an opening 1A and 3A to allow the passage of a gas to the first sensor element 2. The substrate 1 and the cover 3 can be made of the same material or from different materials. In some implementations, the substrate 1 and the cover 3 can be based on glass, on a semiconductor (such as silicon), or on a ceramic.

The resonant element 2A can be configured in some implementations as a MEMS element and also in some implementations from silicon. FIGS. 1A and 1B show that the resonant element 2A is configured in the shape of a tuning fork. However, other shapes of the resonant element are also possible, such as a single beam. In some implementations, the resonant element 2A has a resonance frequency so that the properties of the gas can be determined by a shift in the resonance frequency and/or the activation of higher oscillation modes.

The term "resonance frequency" is used here as synonymously with the terms "fundamental oscillation frequency" or "natural frequency".

According to one implementation of the gas sensor 10 of FIGS. 1A and 1B, the length of the tines of the tuning fork 2A is in a range from 0.5 mm to 2 mm and the width is in a range from 50 μm to 150 μm. The tines can have a rectangular or square cross-section.

According to one implementation of the gas sensor 10 of FIGS. 1A and 1B, the tuning fork 2A has a resonance frequency greater than 100 kHz.

For example, the tuning fork 2A can be based on or consist of silicon,
have a length l of 1 mm,
a width a of 100 μm,
a cross-section A of $1.0 \times 10^{-8}$ m$^2$,
a modulus of elasticity $E = 1.5 \times 10^{11}$ N/m$^2$,
a density $\rho = 2330$ kg/m$^3$, and
an area moment of inertia/cross-section $I/A = 8.33333 \times 10^{-10}$ m$^2$
so that the resonance frequency f given by
$f = 1.875^2 / 2\pi l^2 \times \sqrt{EI/\rho A}$ amounts to
$f = 129{,}598$ Hz.

The gas to be detected that surrounds the tuning fork 2A then results in a shift of the resonance frequency for the generation of higher oscillation modes. It is not necessary for openings 1A and 3A to be provided in both the substrate 1 as well as in the cover 3. It is sufficient if only one of the two contains an opening for the passage of the gas, so that the gas can reach the tuning fork 2A.

The gas sensor 10 can also comprise a second semiconductor-based sensor element 4, which has an acoustic resonator 4A that can be configured as a Helmholtz resonator, for example. Like the tuning fork 2A, the acoustic resonator 4A can have a defined natural frequency. This natural frequency is also shifted when a gas is present in the resonator, wherein the degree of displacement depends on the density of the gas.

The width b of the resonator 4 can be in a range between 2 mm and 6 mm, while the height h can be in a range between 0.3 mm and 1 mm.

In order to prevent coupling or interlocking of the two natural frequencies, it may be provided that the first sensor element 2 and/or the second sensor element 4 are produced in such a way that a resonance frequency of the resonant element 2A is more than an order of magnitude greater than a resonance frequency of the acoustic resonator 4A. This would be ensured, for example, by making the resonance frequency of the second sensor element 4 less than 10 kHz while at the same time the resonance frequency of the first sensor element 2 is greater than 100 kHz.

However, other cases are also conceivable in which it is desirable for the two natural frequencies to be similar to each other (e.g., the oscillators are coupled together).

In some implementations, it may be provided that, as shown in FIG. 1A, the first sensor element 2 and the second sensor element 4 are formed in sub-layers of a semiconductor layer which is arranged between the substrate 1 and the cover 3. These sub-layers can be based on silicon or consist of silicon and can be directly adjacent to each other. The upper sub-layer with the first sensor element 2 can be directly adjacent to the cover, and the lower sub-layer with the second sensor element 4 can be directly adjacent to the substrate 1.

In some implementations, both the substrate 1 and the cover 3 may have been connected to the respective semiconductor layer by bonding methods such as wafer bonding or anodic bonding.

FIG. 2 shows a lateral cross-sectional view of an example implementation of a combined gas sensor, which in addition to the gas sensor shown in FIGS. 1A and 1B has a pressure sensor.

This combined gas sensor 100 contains the gas sensor 10 already described in FIGS. 1A and 1B and additionally a pressure sensor 20, which can be arranged directly laterally adjacent to the gas sensor 10. The pressure sensor 20 can be constructed in a similar manner to the gas sensor 10. In some implementations, the pressure sensor 20 can have a substrate 21, a cover 23, and first and second semiconductor layers, such as silicon-based layers 22 and 24. The substrate 21 can have an opening 21.1 through which gas can flow in. In the second semiconductor layer 24 also, an opening 24.1 can be formed through which the gas can continue flowing to the first semiconductor layer 22.

The pressure sensor 20 can be constructed such that the first semiconductor layer 22 can have a pressure sensor element 22.1 which can be formed as a diaphragm, for example. In some implementations, the cover 23 can have a cavity 23.1 and the gas pressure-dependent deflection of the diaphragm 22.1 into the cavity 23.1 can be measured in various ways, including capacitively or by the change in the air volume in the cavity 23.1.

The combined gas sensor 100 can prove to be advantageous because the density and/or viscosity of the gas measured by the gas sensor 10 is pressure-dependent. Although the pressure could theoretically also be measured using a separate pressure sensor at a different place, the combined pressure sensor 100 offers the possibility to measure the pressure at a distance of only a few millimeters from the gas sensor 10, for example, so that local pressure differences should no longer be significant.

The combined gas sensor 100 can otherwise be advantageously produced in the form of an integrated process. This includes the provision of a substrate integrally containing the substrates 1 and 21, in which an opening is formed in the substrate 21 and optionally an opening 1A is formed in the substrate 1. A semiconductor layer is then applied to the integral substrate and the first and second sensor elements 2 and 4 as well as the opening 24.1 and the sensor element 22.1 are formed in the semiconductor layer. A cover integrally containing the covers 3 and 23 is then applied to the top sub-layer of the semiconductor layer, wherein an opening 3A is optionally formed in the cover 3.

It can be equally advantageous also to provide a temperature sensor, which is preferably also integral, as the density and/or viscosity of the gas are also temperature-dependent.

The above process is also advantageously carried out in the form of a batch process in which a multiplicity of combined gas sensors from FIG. 2 can be produced. The same applies to the production of gas sensors from FIGS. 1A and 1B.

FIG. 3 shows a lateral cross-sectional view of an example implementation of a gas sensor which is housed in a package.

The gas sensor package 200 of FIG. 3 comprises, in some implementations, a gas sensor 10, as already shown and described in FIGS. 1A and 1B. This gas sensor 10 is connected to the top surface of the cover on both sides of the opening 3A to the upper planar ends of two leads of a lead frame 210, for example, using an adhesion layer 220. The two leads of the lead frame 210 are bent downwards mirror-symmetrically as far as the lower planar sections. The electrical contact is made by two bonding wires which are routed from the central sections of the two leads to electrical bonding pads on the lower surface of the substrate 1. Then an encapsulation 240 is applied, for example, consisting of a conventional molding material such as an epoxy resin.

In some implementations, the encapsulation 240 contains an upper through-opening 240A which is arranged above the through-opening of the cover 3A, and a lower through-opening 240B which is arranged underneath the through-opening 1A of the substrate 1, so that the gas to be detected can flow through the gas sensor 10. In some implementations, as mentioned above, the gas sensor 10 can also be configured in such a way that a through-opening is only present either in the substrate 1 or in the cover 3, so that in this case only exactly one corresponding through-opening has to be formed in the encapsulation also.

Figure 4:
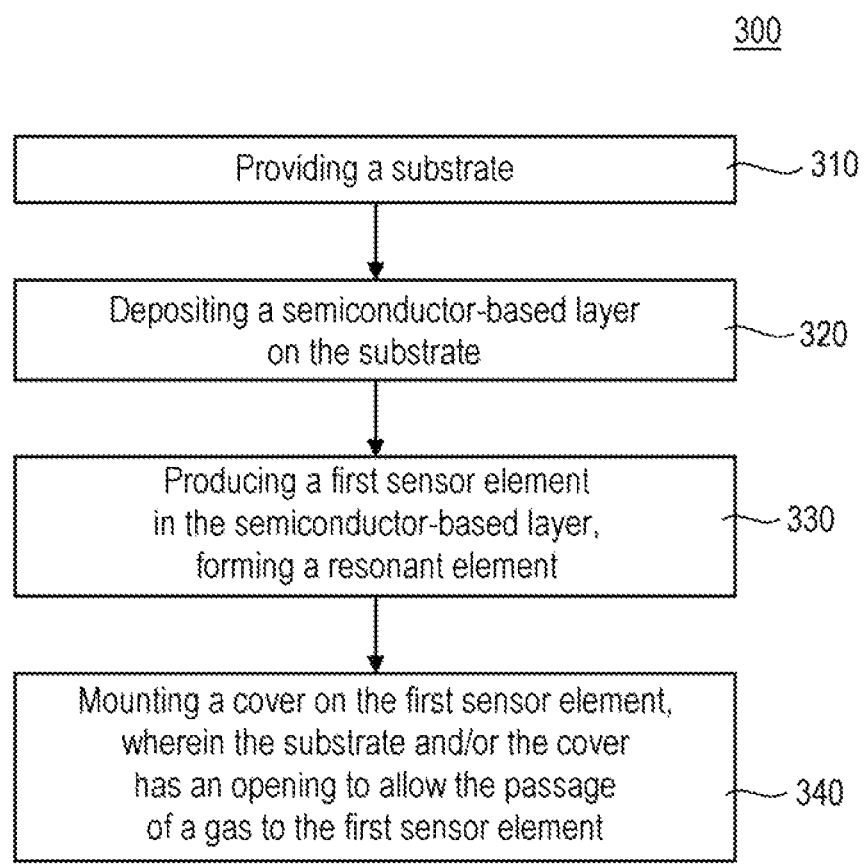
FIG. 4 shows a flow diagram for an example method for producing a gas sensor which has a first sensor element with a resonant element.

FIG. 4 shows a flow diagram for an example method for producing a gas sensor which comprises a first sensor element with a resonant element.

The method 300 for producing a gas sensor comprises:
providing a substrate (310);
depositing a semiconductor-based layer on the substrate (320);
producing a first sensor element in the semiconductor-based layer, forming a resonant element (330); and
mounting a cover on the first sensor element, wherein the substrate and/or the cover has an opening to allow the passage of a gas to the first sensor element (340).

According to one implementation of the method, the resonant element has the shape of a tuning fork or a single beam.

According to one implementation, the method also comprises producing a second sensor element in the semiconductor-based layer, thereby forming an acoustic resonator in the semiconductor-based layer.

According to one implementation, the method also comprises producing an additional semiconductor-based sensor element laterally next to the first sensor element and the second sensor element, if present. The additional sensor element can be a pressure sensor.

According to one implementation of the method, the first sensor element and/or the second sensor element, if present, and/or the additional sensor element, if present, are produced as MEMS components.

According to one implementation of the method, the cover is mounted on the first sensor element using wafer-bonding or anodic bonding.

Other implementations of the method can be formed by combinations with features such as those described above in connection with the gas sensor, the combined gas sensor, or the gas sensor package.

In general, such a gas sensor can be used to detect different gases, but in particular hydrogen. The sensors can be mounted in or on any type of container or pipe in which gaseous hydrogen is stored or transported, in order to perform leak detection, for example. An important field of application is that of a fuel cell and here in particular, on an inlet and/or outlet opening or in the passenger compartment of a motor vehicle powered by a fuel cell.

Aspects

In the following, devices and methods according to the disclosure are explained based on Aspects.

Aspect 1 is a gas sensor comprising a substrate, a first semiconductor-based sensor element 2 for determining the density and/or viscosity of a gas, which element is arranged above the substrate 1 and has a resonant element 2A and a cover 3 arranged above the first sensor element 2, wherein the substrate 1 and/or the cover 3 has an opening to allow the passage of a gas to the first sensor element 2.

Aspect 2 is a gas sensor according to Aspect 1, in which the resonant element 2A has the shape of a tuning fork or a single beam.

Aspect 3 is a gas sensor according to Aspect 1 or 2, in which the resonant element has a resonance frequency greater than 100 kHz.

Aspect 4 is a gas sensor according to one of the previous Aspects, also comprising a second semiconductor-based sensor element for determining the density of the gas, which comprises an acoustic resonator.

Aspect 5 is a gas sensor according to Aspect 4, in which the acoustic resonator is a Helmholtz resonator.

Aspect 6 is a gas sensor according to Aspect 4 or 5, in which the resonance frequency of the acoustic resonator is less than 10 kHz.

Aspect 7 is a gas sensor according to one of the Aspects 4 to 6, in which the first sensor element and the second sensor element are formed in sub-layers of a semiconductor layer which is arranged between the substrate and the cover.

Aspect 8 is a gas sensor according to one of the Aspects 4 to 7, in which the first sensor element and/or the second sensor element are produced in such a way that a resonance frequency of the resonant element is more than an order of magnitude less than a resonance frequency of the acoustic resonator.

Aspect 9 is a gas sensor according to one of the previous Aspects, also comprising an additional semiconductor-based sensor element for measuring the pressure of the gas, which is arranged laterally next to the first sensor element and the second sensor element, if present.

Aspect 10 is a gas sensor according to one of the previous Aspects, in which the first sensor element and/or the second sensor element, if present, and/or the additional sensor element, if present, are produced as MEMS components.

Aspect 11 is a gas sensor according to one of the previous Aspects, in which the opening in the substrate and/or the lid contains a particle filter.

Aspect 12 is a method for producing a gas sensor, the method comprising:
providing a substrate;
depositing a semiconductor-based layer on the substrate;
producing a first sensor element in the semiconductor-based layer, forming a resonant element;
mounting a cover on the first sensor element, wherein the substrate and/or the cover has an opening to allow the passage of a gas to the first sensor element.

Aspect 13 is a method according to Aspect 12, wherein the resonant element has the shape of a tuning fork or a single beam.

Aspect 14 is a method according to Aspect 12 or 13, the method further comprising: producing a second sensor element in the semiconductor-based layer, forming an acoustic resonator in the semiconductor-based layer.

Aspect 15 is a method according to one of the Aspects 12 to 14, the method further comprising:
producing an additional semiconductor-based sensor element laterally next to the first sensor element and the second sensor element, if present.

Aspect 16 is a method according to one of the Aspects 12 to 15, in which the first sensor element and/or the second sensor element, if present, and/or the additional sensor element, if present, are produced as MEMS components.

Aspect 17 is a method according to one of the Aspects 12 to 16, in which the cover is mounted on the first sensor element by wafer-bonding or anodic bonding.

Aspect 18 is a use of a gas sensor according to one of the Aspects 1 to 11 for detecting hydrogen.

Aspect 19 is a use of a gas sensor according to Aspect 18 in a container or in pipes in which gaseous hydrogen is stored or transported.

Aspect 20 is a use of a gas sensor according to one of the Aspects 1 to 11 in a fuel cell.

Aspect 21 is a use of a gas sensor according to Aspect 20, wherein the gas sensor is mounted at an inlet port and/or an outlet port of the fuel cell.

Aspect 22 is a use of a gas sensor according to any one of claims 1 to 11 in the passenger compartment of a motor vehicle powered by a fuel cell.

Aspect 23 is a use of a gas sensor according to one of claims 1 to 11 for detecting leaks, in particular of hydrogen.

Although specific implementations have been illustrated and described here, those who are normally familiar with the art will appreciate that a plurality of alternative and/or equivalent implementations can replace the specific implementations shown and described without exceeding the scope of the present disclosure. This application is intended to cover all modifications or variations of the specific implementations discussed herein. It is therefore intended that this disclosure is limited only by the claims and their equivalents.

The invention claimed is:

1. A gas sensor, comprising:
a substrate;
a first semiconductor-based sensor element for determining at least one of a density of a gas or a viscosity of the gas, wherein the first semiconductor-based sensor element is arranged above the substrate and includes a resonant element, wherein the first semiconductor-based sensor element comprises a first semiconductor layer that defines a first opening, and wherein the resonant element extends laterally from an edge of the first opening partially over the first opening such that the resonant element hangs over the first opening;
a second semiconductor-based sensor element for determining the density of the gas, wherein the second semiconductor-based sensor element includes an acoustic resonator; and
a cover arranged above the first semiconductor-based sensor element,
wherein the substrate or the cover has a second opening, and
wherein the first opening, the acoustic resonator, and the second opening are coupled together to allow a passage of the gas to the first semiconductor-based sensor element for interacting with the resonant element and to the second semiconductor-based sensor element for interacting with the acoustic resonator.

2. The gas sensor as claimed in claim 1, wherein the resonant element has a shape of a tuning fork or a single beam.

3. The gas sensor as claimed in claim 1, wherein the resonant element has a resonance frequency greater than 100 kHz.

4. The gas sensor as claimed in claim 1, wherein the acoustic resonator is a Helmholtz resonator.

5. The gas sensor as claimed in claim 1, wherein a resonance frequency of the acoustic resonator is less than 10 kHz, and
wherein the resonant element has a resonance frequency greater than 100 kHz.

6. The gas sensor as claimed in claim 1, wherein the first semiconductor-based sensor element and the second semiconductor-based sensor element are formed in sub-layers of a semiconductor layer which is arranged between the substrate and the cover.

7. The gas sensor as claimed in claim 1, wherein at least one of the first semiconductor-based sensor element or the second semiconductor-based sensor element are produced in such a way that a resonance frequency of the resonant element is more than an order of magnitude than a resonance frequency of the acoustic resonator.

8. The gas sensor as claimed in claim 1, further comprising:
an additional semiconductor-based sensor element for measuring a pressure of the gas, wherein the additional semiconductor-based sensor element is arranged laterally next to the first semiconductor-based sensor element and the second semiconductor-based sensor element.

9. The gas sensor as claimed in claim 8, wherein at least one of the first semiconductor-based sensor element, the second semiconductor-based sensor element, or the additional semiconductor-based sensor element are produced as MEMS components.

10. The gas sensor as claimed in claim 1, wherein the second opening in the substrate or in the cover includes a particle filter.

11. The gas sensor as claimed in claim 1, wherein the gas sensor is included in a fuel cell.

12. The gas sensor as claimed in claim 1, wherein the cover is arranged on the first semiconductor-based sensor element.

13. The gas sensor as claimed in claim 1, wherein the substrate has the second opening, and
wherein the cover has a third opening to allow the passage of the gas to the first semiconductor-based sensor element for interacting with the resonant element and to the second semiconductor-based sensor element for interacting with the acoustic resonator.

14. The gas sensor as claimed in claim 1, wherein the acoustic resonator is a chamber that is adjacent to the first opening.

15. The gas sensor as claimed in claim 1, wherein the second semiconductor-based sensor element comprises a second semiconductor layer that defines the acoustic resonator,
wherein the first semiconductor layer is coupled to the second semiconductor layer to form a stacked structure that is arranged between the substrate and the cover, and
wherein the first opening, the acoustic resonator, and the second opening are coupled together to allow the passage of the gas between the first opening and the acoustic resonator for the gas to interact with the resonant element and the acoustic resonator.

16. The gas sensor as claimed in claim 15, wherein the resonant element extends laterally over the acoustic resonator such that the resonant element hangs over the acoustic resonator.

17. The gas sensor as claimed in claim 15, wherein the substrate has the second opening,
wherein the cover has a third opening to allow the passage of the gas, and
wherein the first opening, the acoustic resonator, the second opening, and the third opening are coupled together to allow the passage of the gas between the second opening and the third opening for the gas to interact with the resonant element and the acoustic resonator.

18. The gas sensor as claimed in claim 17, wherein the first opening, the acoustic resonator, the second opening, and the third opening are coupled together to allow the passage of the gas to flow through the first opening and the acoustic resonator.

19. The gas sensor as claimed in claim 1, wherein the second semiconductor-based sensor element is coupled to the first semiconductor-based sensor element such that the second semiconductor-based sensor element is arranged between the first semiconductor-based sensor element and the substrate.

20. The gas sensor as claimed in claim 1, wherein the first opening has a first width and the acoustic resonator has a second width that is greater than the first width.

21. The gas sensor as claimed in claim 1, wherein the cover and the second semiconductor-based sensor element are attached to the first semiconductor-based sensor element in a layer stack formation, with the first semiconductor-based sensor element and the second semiconductor-based sensor element being arranged adjacent to each other, and the cover being arranged on the first semiconductor-based sensor element, and
wherein the substrate, the second semiconductor-based sensor element, the first semiconductor-based sensor element, and the cover are coupled together in a vertical stack.

22. The gas sensor as claimed in claim 1, wherein the resonant element extends laterally over the acoustic resonator such that the resonant element hangs over the acoustic resonator.

* * * * *